(12) United States Patent
Mehl

(10) Patent No.: US 7,354,509 B1
(45) Date of Patent: Apr. 8, 2008

(54) WASTEWATER TREATMENT SYSTEM

(76) Inventor: Ronald C Mehl, 527 Waterford Dr., Cartersville, GA (US) 30120

( * ) Notice: Subject to any disclaimer, the term of this patent is extended or adjusted under 35 U.S.C. 154(b) by 280 days.

(21) Appl. No.: 10/822,578

(22) Filed: Apr. 12, 2004

(51) Int. Cl.
*B01D 35/06* (2006.01)
*B01D 59/38* (2006.01)

(52) U.S. Cl. .................. 210/85; 204/519; 204/661; 204/664; 204/666; 210/87; 210/96.1; 210/143; 210/243; 210/259

(58) Field of Classification Search .............. 210/85, 210/96.1, 143, 202, 205, 223, 259, 739, 806, 210/702, 748, 87, 243; 204/518, 519, 553–557, 204/571–573, 660–666, 627, 628
See application file for complete search history.

(56) References Cited

U.S. PATENT DOCUMENTS

| | | | | |
|---|---|---|---|---|
| 4,014,766 A | * | 3/1977 | Watanabe et al. | 205/746 |
| 5,236,595 A | * | 8/1993 | Wang et al. | 210/669 |
| 6,346,197 B1 | * | 2/2002 | Stephenson et al. | 210/726 |
| 6,482,327 B1 | * | 11/2002 | Mori et al. | 210/695 |
| 6,535,795 B1 | * | 3/2003 | Schroeder et al. | 700/266 |
| 6,802,981 B2 | * | 10/2004 | Ryazanova et al. | 210/726 |
| 2005/0218077 A1 | * | 10/2005 | Brunsell | 210/650 |

* cited by examiner

*Primary Examiner*—Joseph Drodge
(74) *Attorney, Agent, or Firm*—George Ronald Reardon

(57) ABSTRACT

A wastewater treatment system comprising means of decontaminating wastewater; means of measuring control parameters of the wastewater; means for controlling said decontamination means; and a programmable logic controller. The user is able to receive control parameter data and control the various processes of the wastewater treatment system from a remote location.

5 Claims, 8 Drawing Sheets

WASTEWATER TREATMENT SYSTEM

BACKGROUND OF THE INVENTION

1. Field of the Invention

The present invention relates generally to wastewater treatment systems and, more specifically, to wastewater treatment system having combined processes in order to minimize space requirements and maximize effluent quality without the use of chemical additives. An Energized Magnetic Media Filter (EMF) process utilizes electrolytic reactions and other electrical energy technologies to accomplish the processing steps of coagulation, oxidation, sterilization, and solids removal from the waste stream. Coagulants, oxidation species, and the killing of pathogens are accomplished using variations in electrical energy technology. The EMF process does not require the use of chemical additives in the purification process. As a result, the entire process from influent to effluent can be controlled, adjusted, monitored, and analyzed from any remote location. This results in lower operating costs and flexibility in waste streams to be treated.

2. Description of the Prior Art

Numerous other types of wastewater treatment systems exist in the prior art. While these wastewater treatment systems may be suitable for the purposes for which they were designed, they would not be as suitable for the purposes of the present invention, as hereinafter described.

SUMMARY OF THE PRESENT INVENTION

The present invention relates generally to wastewater treatment systems and, more specifically, to wastewater treatment system having combined processes in order to minimize space requirements and maximize effluent quality without the use of chemical additives. An Energized Magnetic Media Filter (EMF) process utilizes electrolytic reactions and other electrical energy technologies to accomplish the processing steps of coagulation, oxidation, sterilization, and solids removal from the waste stream. Coagulants, oxidation species, and the killing of pathogens are accomplished using variations in electrical energy technology. The EMF process does not require the use of chemical additives in the purification process. As a result, the entire process from influent to effluent can be controlled, adjusted, monitored, and analyzed from any remote location. This results in lower operating costs and flexibility in waste streams to be treated.

A primary object of the present invention is to provide a wastewater treatment system that overcomes the shortcomings of the prior art.

Another object of the present invention is to provide a wastewater treatment system having a compact design.

Yet another object of the present invention is to provide a wastewater treatment system having modular construction.

Still yet another object of the present invention is to provide a wastewater treatment system capable of remote control.

A further object of the present invention is to provide a wastewater treatment system capable of automated maintenance and control.

Yet a further object of the present invention is to provide a wastewater treatment system having a low retention time.

Still yet a further object of the present invention is to provide a wastewater treatment system expandable to large flows quickly.

Another object of the present invention is to provide a wastewater treatment system wherein no chemical additives are required.

Yet another object of the present invention is to provide a wastewater treatment system having automated anode placement.

Still yet another object of the present invention is to provide a wastewater treatment system wherein the anode materials are low cost and 100% expendable.

A further object of the present invention is to provide a wastewater treatment system utilizing recycled filter media.

An even further object of the present invention is to provide a wastewater treatment system having an uninterrupted filter discharge.

Yet an even further object of the present invention is to provide a wastewater treatment system having dry sludge discharge.

Another object of the present invention is to provide a wastewater treatment system having 99.8% TSS removal and BOD reduction of <0.01 mg/L.

Yet another object of the present invention is to provide a wastewater treatment system having a high oxygen uptake.

Still yet another object of the present invention is to provide a wastewater treatment system having odor and color control.

Still another object of the present invention is to provide a wastewater treatment system that is simple and easy to use.

Still yet another object of the present invention is to provide a wastewater treatment system that is inexpensive to manufacture and use.

Additional objects of the present invention will appear as the description proceeds.

The present invention overcomes the shortcomings of the prior art by providing a wastewater treatment system having combined processes in order to minimize space requirements and maximize effluent quality without the use of chemical additives. An Energized Magnetic Media Filter (EMF) process utilizes electrolytic reactions and other electrical energy technologies to accomplish the processing steps of coagulation, oxidation, sterilization, and solids removal from the waste stream. Coagulants, oxidation species, and the killing of pathogens are accomplished using variations in electrical energy technology. The EMF process does not require the use of chemical additives in the purification process. As a result, the entire process from influent to effluent can be controlled, adjusted, monitored, and analyzed from any remote location. This results in lower operating costs and flexibility in waste streams to be treated.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
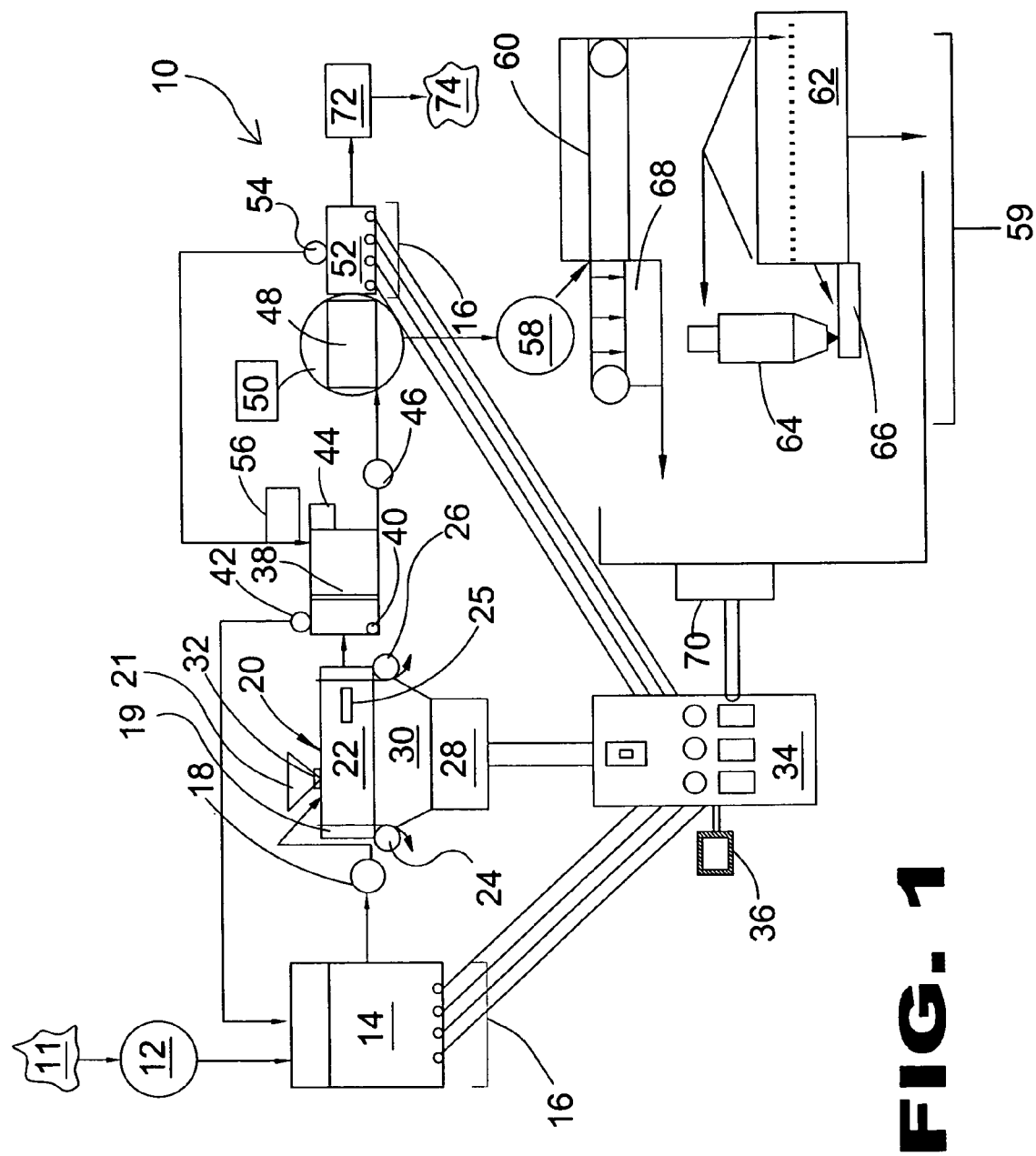
FIG. 1 is a block diagram of the wastewater treatment system of the present invention.

Turning now descriptively to the drawings, in which similar reference characters denote similar elements throughout the several views, the Figures illustrate the wastewater treatment system of the present invention. With regard to the reference numerals used, the following numbering is used throughout the various drawing Figures.

10 wastewater treatment system
11 influent
12 head works grit removal
13 effluent
14 primary reservoir
16 ion probes
18 primary reactor influent pump
19 grinder section
20 primary reactor
21 anode reserve hopper
22 energized media bed
23 perforated titanium plates
24 fixed anode
25 ultrasonic transducer
26 fixed cathode
27 bearings
28 power supply
29 brush holders
30 cell drive
31 drive motor
32 slide valve
33 actuator
34 programmable logic controller
35 mixer rods
36 monitor
37 rotor
38 intermediate reservoir
39 drip pan
40 analytical instrument
42 primary reactor return pump
44 overflow valve
46 EMF filter influent pump
48 EMF filter
50 air compressor
52 EMF filter effluent reservoir
54 EMF filter return pump
56 float valve
58 EMF reject filter concentrate
59 sludge and media handling stage
60 media separator
62 dryer separator
64 cyclone
66 dry sludge
68 filter reject drain
70 sludge handling monitor
72 UV system
74 final effluent
76 metallic anode media reserve
78 overflow
80 regeneration zone
81 energized treatment zone
82 filter zone
83 sterile zone
84 level control
85 air lift
86 mixed media anode
87 magnetic sand filter media
88 DC electrical contacts
89 solids effluent/filter reject
90 distribution cone
91 weir overflow
92 suspended solids
93 media recovery
94 clean mag/media
95 mag/media bed
96 solid and liquid intake
97 spout connector
98 screen basket
99 screw auger
100 drive motor
101 water discharge
102 contaminated mag/media
103 low density filtrate
104 blower
105 filtrate fines
106 filter reject conduit
107 magnetic separator
108 high density sludge
109 low density fines

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 12 illustrate an wastewater treatment system of the present invention indicated generally by the numeral 10.

FIG. 1 is a block diagram of the wastewater treatment system of the present invention. The wastewater treatment system 10 of the present invention receives influent 11 and converts it to a final effluent 74. Influent 11 refers to wastewater received from upstream into any particular apparatus or process. The head works grit removal 12 pumps the influent 11 to a primary reservoir 14. The wastewater is initially contained in the primary reservoir 14. Several ion probes 16 are connected to the primary reservoir 14 for measuring certain control parameters such as flow, pH, TSS, and DO. These parameters determine the degree of treatment needed to reduce contaminants to acceptable levels. The wastewater is pumped by the primary reactor influent pump 18 into a primary reactor 20. The wastewater is first passed through a grinder section 19 in the forward section of the primary reactor 20. Wastewater enters the primary reactor 20 and travels horizontally through an energized media bed 22. The energized media bed 22 consists of blended bipolar granular electrodes which cause the solids of the wastewater to coagulate. As wastewater travels through the media, the primary reactor 20 is rotated to keep the material loose and to fragment larger particles. The perforated titanium plates 23 contain a fixed anode 24 and a fixed cathode 26. The fixed anode 24 and fixed cathode 26 decompose to produce metal hydroxyl ions. An ultrasonic transducer 25 is positioned within the primary reactor 20 to periodically loosen the media and remove deposits on the stationary contacts through vibrational means. Vibration may be pneumatic, hydraulic, ultrasound, or electromagnetic. The perforated titanium plates 23 are connected to a power supply 28 to supply an electrical current through the primary reactor 20, thereby causing the wastewater to maintain positive contact with the energized media bed 22. A cell drive 30 is connected to the primary reactor 20. An anode reserve hopper 21 is connected to the primary reactor 20 via a slide valve 32. The primary reactor 20 is automatically resupplied with anode mix as it is consumed. The slide valve 32 opens and closes as necessary for the replacement of the anode mix by the anode reserve hopper 21. A programmable logic controller 34 collects data on the measured control parameters throughout the wastewater treatment system 10 and is connected to the DC drive 28, which allows it to control current to the energized media bed 22. A monitor 36 is connected to the programmable logic controller 34 to allow a user to read control parameter levels and control the processes of the wastewater treatment system 10 from a remote location. Wastewater moves from the primary reactor 20 to an intermediate reservoir 38. Coagulated solids from the primary reactor 20 settle to the bottom of the intermediate reservoir 38 where they are sent to the EMF filter. An analytical instrument 40 is positioned within the intermediate reservoir 38 to measure control parameters such as flow, pH, TSS, and DO after the wastewater has been coagulated in the primary reservoir 20. Wastewater that does not sink to the bottom of the intermediate reservoir 38 is returned to the primary reservoir 20 by a primary reactor return pump 42. An overflow valve 44 prevents the intermediate reservoir 38 from overflowing by opening when the volume of wastewater cannot be contained. An energized magnetic media filtration (EMF) filter influent pump 46 pumps the coagulated solids to an EMF filter 48. An EMF filter 48 receives the coagulated solids and separates water from the solid waste using energized filter media. An air compressor 50 continually moves filter media to the top of the EMF filter 48 where it is removed with the sludge. A EMF filter effluent reservoir 52 receives the wastewater. Ion probes 16 are positioned within the EMF filter effluent reservoir 52 for measuring the control parameters of the wastewater. The control parameter measurements are received by the programmable logic controller 34. Optionally, the wastewater contained in the EMF filter effluent reservoir 52 may be returned to the intermediate reservoir 38 by an EMF filter return pump 54. A float valve 56 is preferably positioned between the EMF filter effluent reservoir 52 and the intermediate reservoir 38 for controlling the volume of wastewater pumped from the EMF filter effluent reservoir 52. The EMF reject filter concentrate 58 is sent to sludge and media handling stage 59. The sludge and media handling stage 59 includes a media separator 60, a dryer/separator 62, and a cyclone 64. The media separator 59 removes the media from the wastewater and returns the filter liquor to the primary reactor 20. Clean mag/media returns to the EMF filter 48 from the dryer/separator via a filter reject drain 68. A dryer separator 62 receives the EMF reject filter concentrate 58 and uses hot air to dry the sludge and collect the dust in a hood. The dust is sent to the cyclone 64. The cyclone 64 causes the dried dust to become dry sludge 66. The sludge and media handling stage 59 disposes of the dry sludge 66 produced by the cyclone 64. Preferably, a sludge handling monitor 70 is connected to the sludge and media handling stage 59. The sludge handling monitor 70 collects data from the sludge and media handling stage 59 and sends the data to the programmable logic controller 34. The clean water filtered from the EMF filter 48 travels to a UV system 72 for further decontamination. After the wastewater has been fully decontaminated, it becomes final effluent 74.

Figure 2:
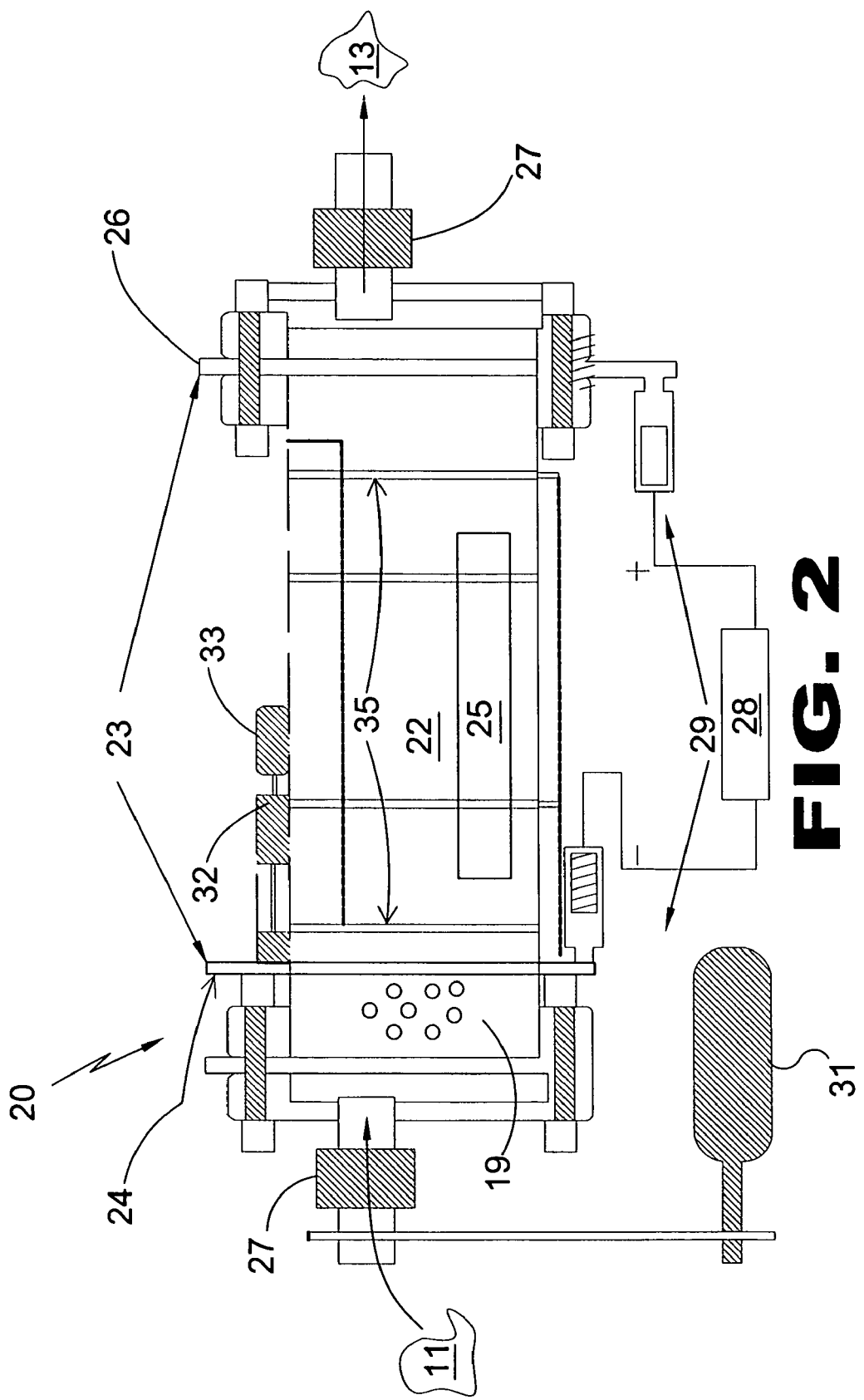
FIG. 2 is a side view of the primary reactor of the wastewater treatment system of the present invention.

FIG. 2 is a side view of the primary reactor of the wastewater treatment system of the present invention. Influent 11 refers to wastewater received from upstream into any particular apparatus or process. The wastewater is first passed through a grinder section 19 in the forward section of the primary reactor 20. Wastewater enters the primary reactor 20 and travels horizontally through an energized media bed 22. The energized media bed 22 consists of blended bipolar granular electrodes which cause the solids of the wastewater to coagulate. As wastewater travels through the media, the primary reactor 20 is rotated to keep the material loose and to fragment larger particles. Perforated titanium plates 23 are positioned on either end of the primary reactor 20. An ultrasonic transducer 25 is positioned within the primary reactor 20 to periodically loosen the media and remove deposits on the stationary contacts through vibrational means. Vibration may be pneumatic, hydraulic, ultrasound, or electromagnetic. The perforated titanium plates 23 contain a fixed anode 24 and a fixed cathode 26. The fixed anode 24 and fixed cathode 26 decompose to produce metal hydroxyl ions. The perforated titanium plates 23 are connected to a power supply 28 to supply an electrical current through the primary reactor 20, thereby causing the wastewater to maintain positive contact with the energized media bed 22. The power supply 28 is connected to the fixed anode 24 and fixed cathode 26 via brush holders 29. The pipes transporting the influent 11 and effluent 13 are connected to the primary reactor 20 with bearings 27. A drive motor 31 is connected to the primary reactor 20 for rotating the reactor to keep the media and wastewater loose. Effluent 13 refers to the wastewater after it has been treated and sent downstream from any particular apparatus or process.

Figure 3:
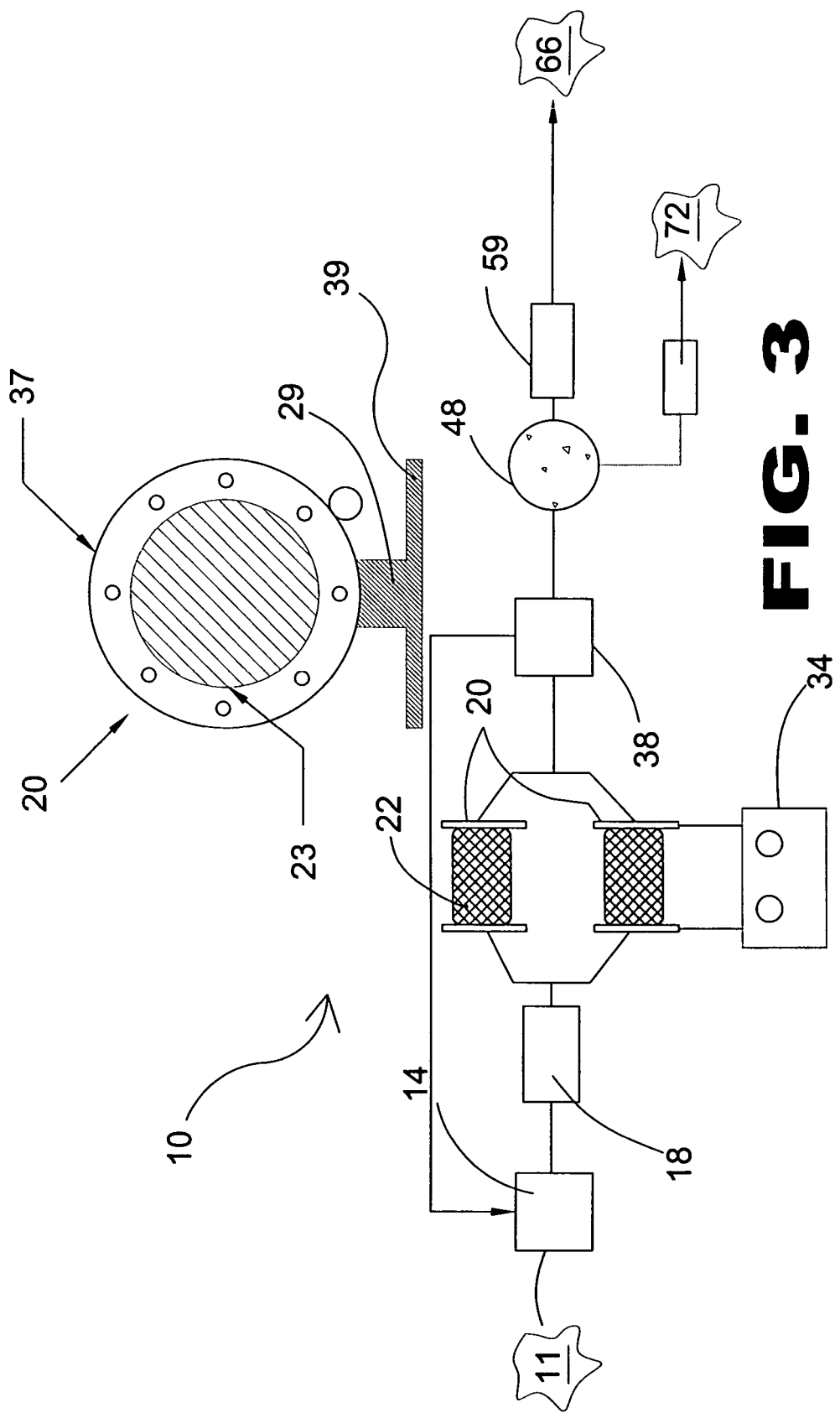
FIG. 3 is a sectional view and block diagram of the primary reactor of the wastewater treatment system of the present invention.

FIG. 3 is a sectional view and block diagram of the primary reactor of the wastewater treatment system of the present invention. The wastewater treatment system 10 of the present invention receives influent 11 and converts it to a final effluent 74. Influent 11 refers to wastewater received from upstream into any particular apparatus or process. The wastewater is initially contained in the primary reservoir 14. The wastewater is pumped by the primary reactor influent pump 18 into a primary reactor 20. Wastewater enters the primary reactor 20 and travels horizontally through an energized media bed 22. The energized media bed 22 consists of blended bipolar granular electrodes which cause the solids of the wastewater to coagulate. As wastewater travels through the media, the primary reactor 20 is rotated to keep the material loose and to fragment larger particles. A programmable logic controller 34 collects data on the measured control parameters throughout the wastewater treatment system 10 and is connected to the DC drive 28, which allows it to control current to the energized media bed 22. Wastewater moves from the primary reactor 20 to an intermediate reservoir 38. Coagulated solids from the primary reactor 20 settle to the bottom of the intermediate reservoir 38 where they are sent to the EMF filter. An EMF filter 48 receives the coagulated solids and separates water from the solid waste using energized filter media. The sludge and media handling stage 59 includes a media separator 60, a dryer/separator 62, and a cyclone 64. The sludge and media handling stage 59 disposes of the dry sludge 66 produced by the cyclone 64. The clean water filtered from the EMF filter 48 travels to a UV system 72 for further decontamination. Perforated titanium plates 23 are positioned on either end of the primary reactor 20. The power supply 28 is connected to the fixed anode 24 and fixed cathode 26 via brush holders 29. A rotor 37 connected to the primary reactor 20 causes the reactor to move in a rotational manner. Preferably, a drip pan 39 is positioned under the primary reactor 20.

Figure 4:
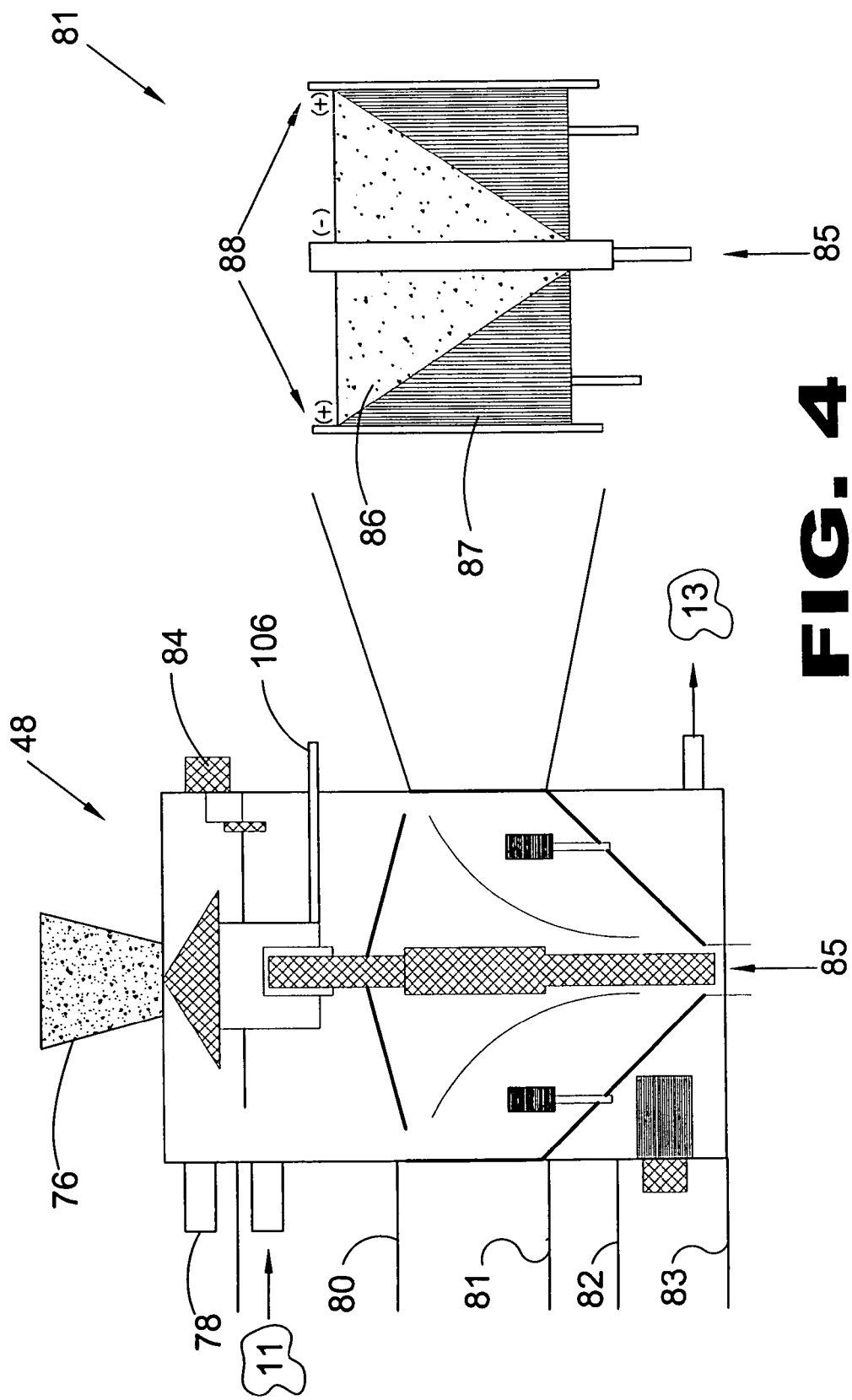
FIG. 4 is a side view of the energized magnetic media filter of the wastewater treatment system of the present invention.

FIG. 4 is a side view of the energized magnetic media filter of the wastewater treatment system of the present invention. An EMF filter 48 receives the coagulated solids and separates water from the solid waste using energized filter media. Influent 11 refers to wastewater received from upstream into any particular apparatus or process. A metallic anode media reserve 76 is preferably positioned above the EMF filter 48 for replacing the lose anode media. Excess wastewater is expelled from the EMF filter 48 as overflow 78. Nearest to the top of the EMF filter is the regeneration zone 80. Directly below the regeneration zone 80 is the energized treatment zone 81. Directly below the energized treatment zone 81 is the filter zone 82. At the bottom of the EMF filter 48 is the sterile zone 83. A level control 84 measures the volume of wastewater contained in the EMF filter 48. An air lift 85 releases pressurized air up the interior of the EMF filter 48. The energized treatment zone 81 contains mixed media anode 86 and magnetic sand filter media 87. DC electrical contacts run through the energized treatment zone 81. Positively charged electrical contacts are positioned on the outside and a negative electrical contact is positioned on the inside of the energized treatment zone 81. Effluent 13 refers to the wastewater after it has been treated and sent downstream from any particular apparatus or process.

Figure 5:
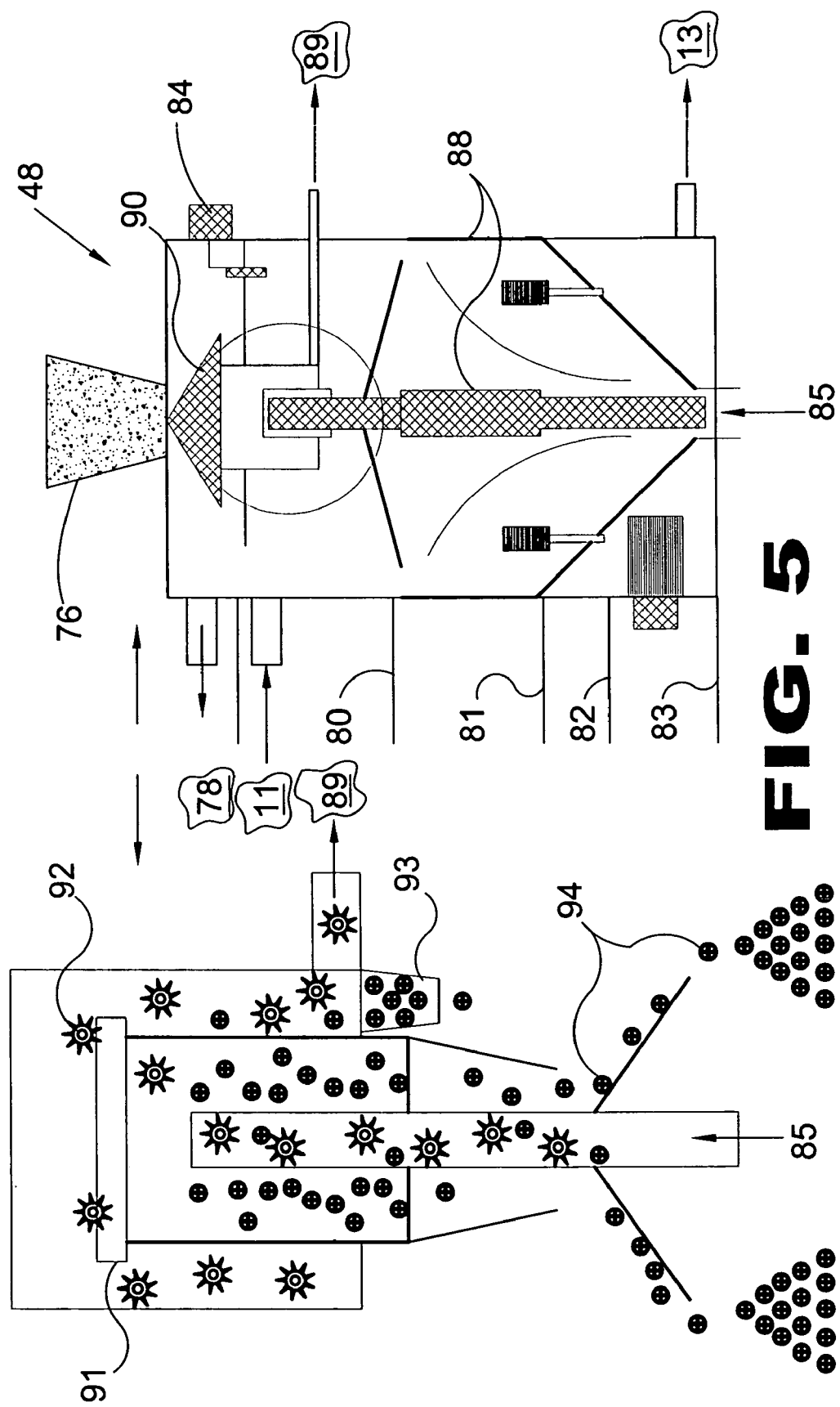
FIG. 5 is an illustrative view of the energized magnetic media filter of the wastewater treatment system of the present invention in use.

FIG. 5 is an illustrative view of the energized magnetic media filter of the wastewater treatment system of the present invention in use. Influent 11 refers to wastewater received from upstream into any particular apparatus or process. An EMF filter 48 receives the coagulated solids and separates water from the solid waste using energized filter media. A metallic anode media reserve 76 is preferably positioned above the EMF filter 48 for replacing the lose anode media. Excess wastewater is expelled from the EMF filter 48 as overflow 78. Nearest to the top of the EMF filter is the regeneration zone 80. Directly below the regeneration zone 80 is the energized treatment zone 81. Directly below the energized treatment zone 81 is the filter zone 82. At the bottom of the EMF filter 48 is the sterile zone 83. A level control 84 measures the volume of wastewater contained in the EMF filter 48. An air lift 85 releases pressurized air up the interior of the EMF filter 48. DC electrical contacts run through the energized treatment zone 81. Positively charged electrical contacts are positioned on the outside and a negative electrical contact is positioned on the inside of the energized treatment zone 81. A distribution cone 90 distributes oxidized wastewater across the surface of the EMF filter 48. A weir overflow 91 is positioned on the top of the air lift 85 above the surface of the wastewater contained within the EMF filter 48. Suspended solids 92 are separated by the weir overflow 91 and expelled as solids effluent/filter reject 89. A media recovery 93 is connected to the side of the weir overflow 91. Solids effluent/filter reject 89 is expelled from the EMF filter 48 via a filter reject conduit 106. Clean mag/media 94 is collected by the media recovery 93.

Figure 6:
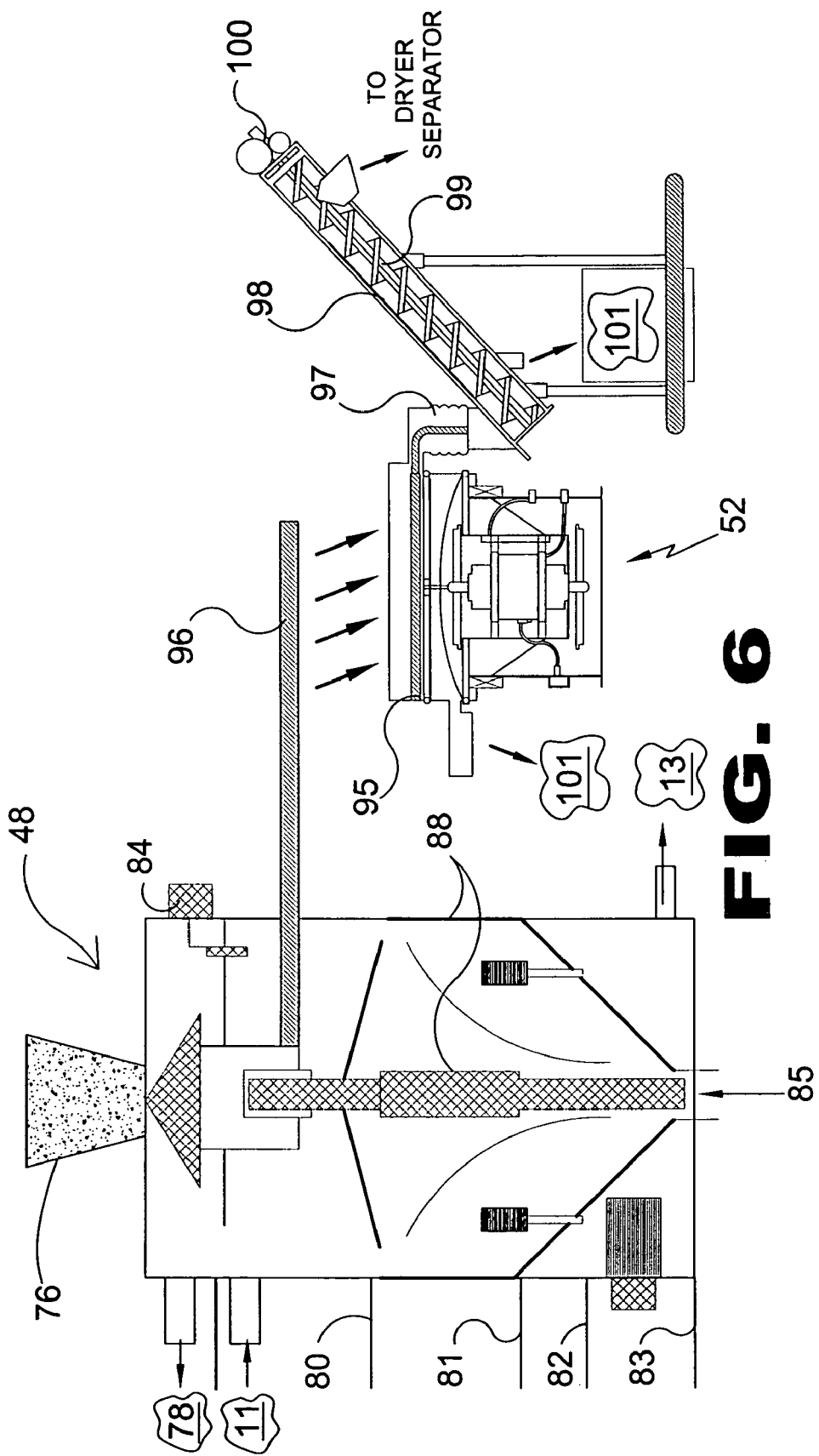
FIG. 6 is an illustrative view of the energized magnetic media filter and solids concentrator of the wastewater treatment system of the present invention in use.

FIG. 6 is an illustrative view of the energized magnetic media filter and solids concentrator of the wastewater treatment system of the present invention in use. An EMF filter 48 receives the coagulated solids and separates water from the solid waste using energized filter media. Influent 11 refers to wastewater received from upstream into any particular apparatus or process. A metallic anode media reserve 76 is preferably positioned above the EMF filter 48 for replacing the lose anode media. Excess wastewater is expelled from the EMF filter 48 as overflow 78. Nearest to the top of the EMF filter is the regeneration zone 80. Directly below the regeneration zone 80 is the energized treatment zone 81. Directly below the energized treatment zone 81 is the filter zone 82. At the bottom of the EMF filter 48 is the sterile zone 83. A level control 84 measures the volume of wastewater contained in the EMF filter 48. An air lift 85 releases pressurized air up the interior of the EMF filter 48. The energized treatment zone 81 contains mixed media anode 86 and magnetic sand filter media 87. DC electrical contacts run through the energized treatment zone 81. Positively charged electrical contacts are positioned on the outside and a negative electrical contact is positioned on the inside of the energized treatment zone 81. Effluent 13 refers to the wastewater after it has been treated and sent downstream from any particular apparatus or process. A EMF filter effluent reservoir 52 receives the wastewater. Ion probes 16 are positioned within the EMF filter effluent reservoir 52 for measuring the control parameters of the wastewater. The control parameter measurements are received by the programmable logic controller 34. Wastewater flows from the EMF filter 48 to the EMF filter effluent reservoir 52 via a solid and liquid intake 96. The mag/media bed 95 is separated on the top of the EMF filter effluent reservoir 52. The mag/media bed 95 flows to a screw auger 99 via a spout connector 97. A screen basket 98 covers the screw auger 99. The screw auger 99 drains excess water and pushes the mag/media bed 97 to a chute leading to the dryer/separator 62. A drive motor 100 causes the screw auger 99 to rotate, thereby pushing the mag/media bed 97 in an upwardly direction. Wastewater separates from the mag/media bed 97 in the EMF filter effluent reservoir 52 and is expelled as water discharge 101.

Figure 7:
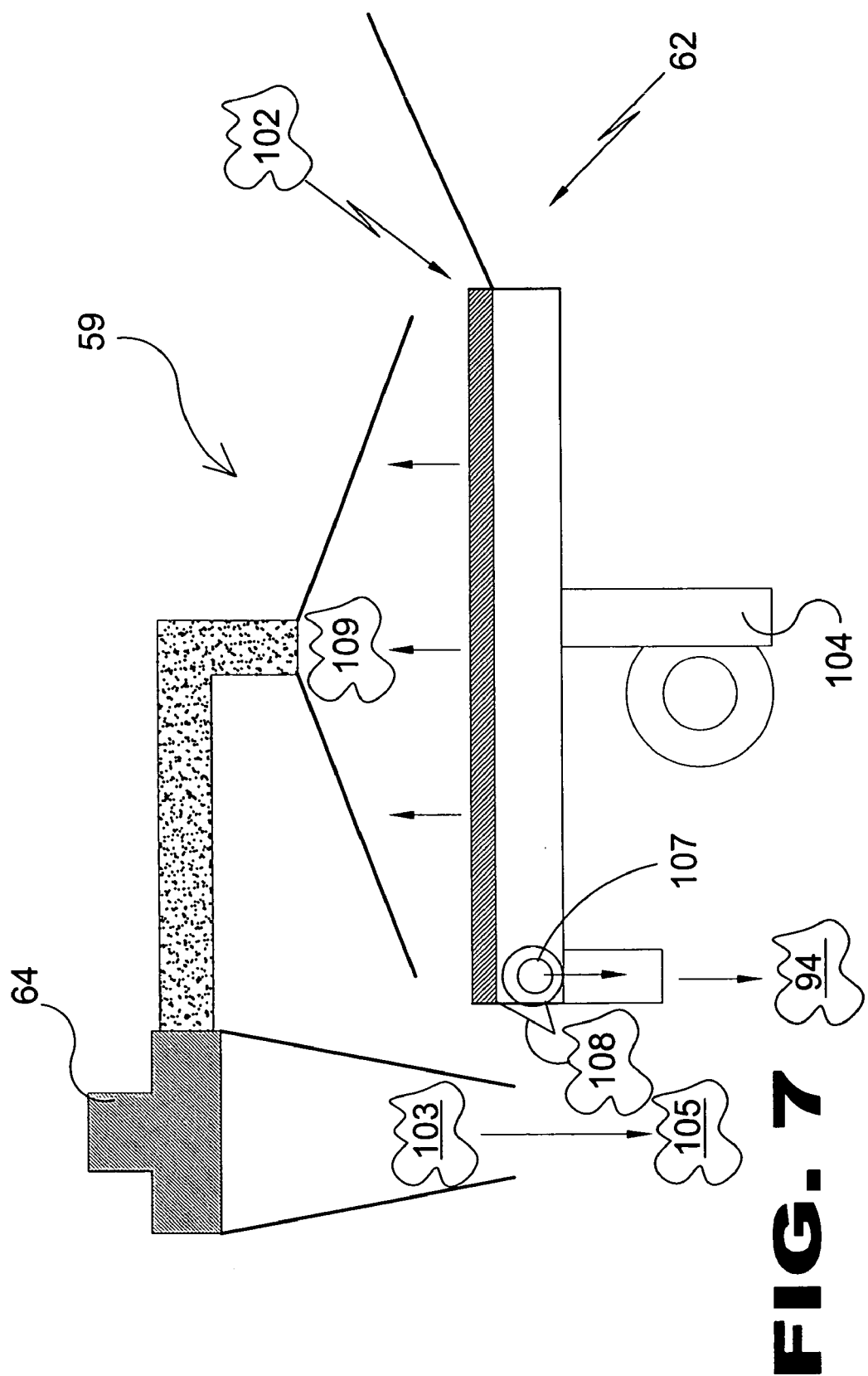
FIG. 7 is a side view of the mag/media dryer separator of the wastewater treatment system of the present invention in use.

FIG. 7 is a side view of the mag/media dryer separator of the wastewater treatment system of the present invention in use. The sludge and media handling stage 59 includes a media separator 60, a dryer/separator 62, and a cyclone 64. A dryer separator 62 receives the EMF reject filter concentrate 58 and uses hot air to dry the sludge and collect the dust in a hood. The dust is sent to the cyclone 64. Contaminated mag/media 102 is received by the dryer/separator 62. A blower 104 expels hot air up through the contaminated mag/media 102. A hot air from the blower 104 releases low density fines 109 from the contaminated mag/media 102. The low density fines 109 are gathered by a hood and sent to the cyclone 64. The cyclone 64 causes the dried dust to become dry sludge 66. The cyclone 64 causes the low density fines 109 to become low density filtrate 103. The low density filtrate 103 is eventually expelled as filtrate fines 105. A magnetic separator 107 removes and recycles clean mag/media 94 from the contaminated mag/media 102. After the low density fines 109 and clean mag/media 94 is removed from the contaminated mag/media 102, the remainder is expelled as high density sludge 108. Clean mag/media 94 is collected by the media recovery 93.

Figure 8:
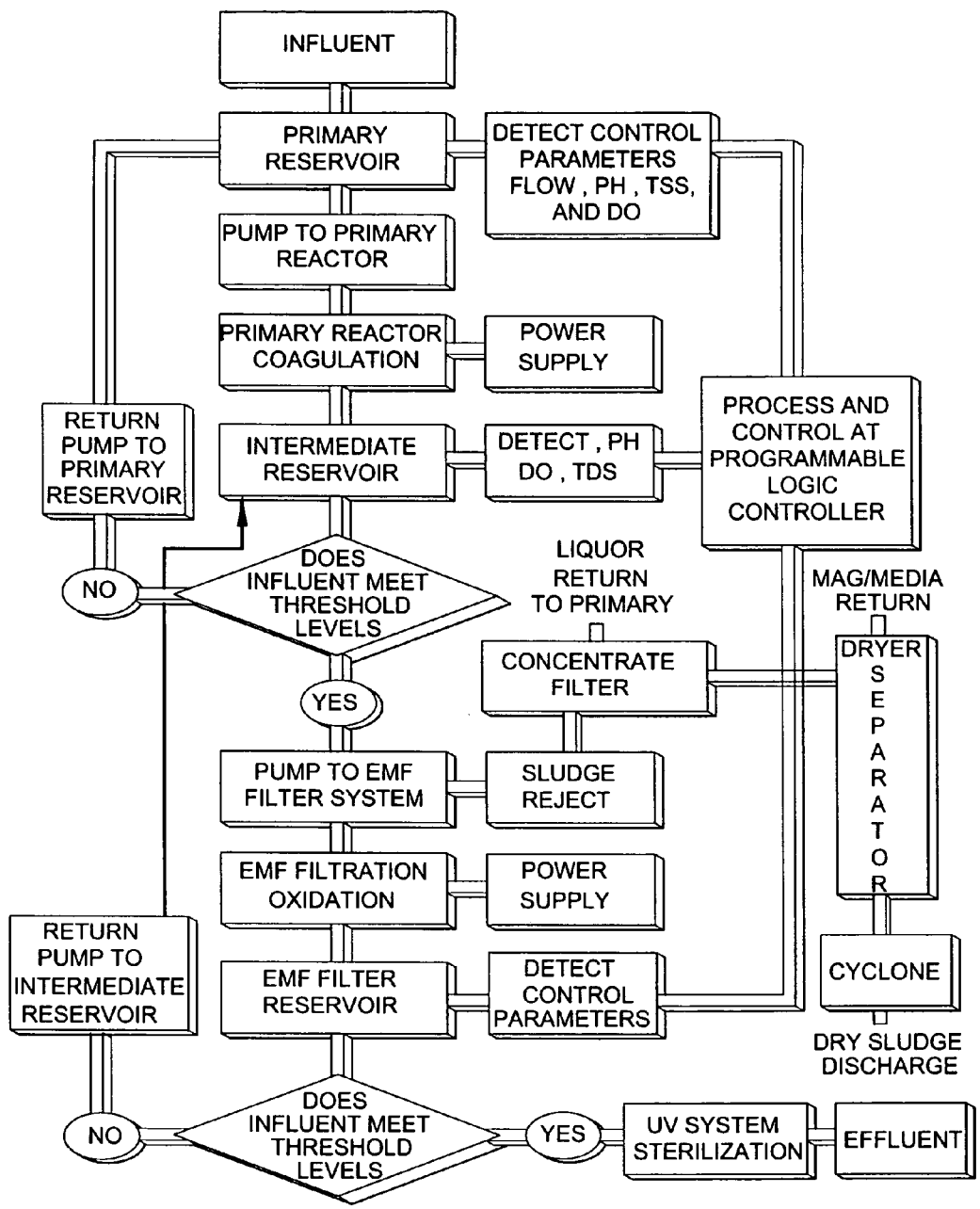
FIG. 8 is a flow diagram of the present invention in use.

FIG. 8 is a flow diagram of the present invention in use. Influent enters the primary reservoir. Control parameters such as flow, pH, TSS, and DO are measured and received and processed at a programmable logic controller. The wastewater is pumped from the primary reservoir to the primary reactor. The primary reactor coagulates the solids in the wastewater. The primary reactor is connected to a power supply. The wastewater is then sent to an intermediate reservoir. Control parameters are again measured and received and processed at the programmable logic controller. If the wastewater does not meet threshold levels, then the wastewater is pumped from the intermediate reservoir to the primary reservoir. If the wastewater meets the threshold levels, then it is pumped to the EMF filter and oxidation stage. The EMF filter is connected to a power supply in order to engage in the filtration and oxidation processes. When the EMF filtration and oxidation is complete, the wastewater is sent to an EMF filter reservoir, where control parameters are measured once again. The control parameters are received and processed at the programmable logic controller. If the influent meets the threshold levels, then it is sent to the UV sterilization system and expelled as clean effluent. If the influent does not meet threshold levels, then the wastewater is returned to the intermediate reservoir. Sludge reject from the EMF filter system is sent to a concentrate filter for further processing. Liquor is returned to the primary reservoir and the sludge reject is sent to the dryer/separator. Clean media is separated and recycled. A cyclone causes the sludge reject to become dry sludge discharge.

It will be understood that each of the elements described above, or two or more together may also find a useful application in other types of methods differing from the type described above.

While certain novel features of this invention have been shown and described and are pointed out in the to the annexed claims, it is not intended to be limited details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A wastewater treatment system comprising:
   a) means for decontaminating wastewater;
   b) probes for measuring control parameters including flow, pH, TSS and DO of the wastewater; and
   c) a programmable logic controller for controlling said means for decontaminating wastewater operable to enable a user to receive control parameter data and control said wastewater treatment system from a remote location,
   wherein said means decontaminating wastewater comprises:
      i) a coagulation stage;
      ii) an energized magnetic media filtration stage;
      iii) an accelerated electro-chemical oxidation stage; and
      iv) a sludge and media handling stage;
   wherein said coagulation stage comprises a primary reactor,
   wherein said primary reactor includes a grinder, means for rotating the primary reactor, and an energized media bed.

2. The wastewater treatment system of claim 1, wherein the energized media bed further comprises perforated titanium plates.

3. The wastewater treatment system of claim 1, wherein the energized media bed further comprises bi-polar electrodes connected to either end of said primary reactor.

4. The wastewater treatment system of claim 3, wherein said bi-polar electrodes comprise:
   a fixed anode;
   a fixed cathode; and
   a power supply wherein said power supply is attached to said anode and said cathode for producing an electrical current through said primary reactor.

5. The wastewater treatment system of claim 1, wherein the sludge and media handling stage comprises an ultrasonic transducer positioned within the primary reactor, capable of creating pneumatic, hydraulic, ultrasound or elector-magnetic vibration.

* * * * *